(12) United States Patent
Hasegawa et al.

(10) Patent No.: US 9,640,213 B2
(45) Date of Patent: May 2, 2017

(54) PERPENDICULAR MAGNETIC RECORDING MEDIUM AND MAGNETIC STORAGE APPARATUS

(71) Applicants: SHOWA DENKO K.K., Tokyo (JP); JAPAN ATOMIC ENERGY AGENCY, Ibaraki (JP)

(72) Inventors: Kota Hasegawa, Chiba (JP); Takahiro Ukai, Chiba (JP); Eishin Yamakawa, Chiba (JP); Shiro Entani, Ibaraki (JP); Seiji Sakai, Ibaraki (JP)

(73) Assignees: SHOWA DENKO K.K., Tokyo (JP); JAPAN ATOMIC ENERGY AGENCY, Ibaraki (JP)

( * ) Notice: Subject to any disclaimer, the term of this patent is extended or adjusted under 35 U.S.C. 154(b) by 0 days.

(21) Appl. No.: 14/935,529

(22) Filed: Nov. 9, 2015

(65) Prior Publication Data

US 2016/0148633 A1 May 26, 2016

(30) Foreign Application Priority Data

Nov. 26, 2014 (JP) ................. 2014-238394

(51) Int. Cl.
*G11B 5/66* (2006.01)
*G11B 5/72* (2006.01)
*G11B 5/82* (2006.01)

(52) U.S. Cl.
CPC ............ *G11B 5/72* (2013.01); *G11B 5/66* (2013.01); *G11B 5/82* (2013.01)

(58) Field of Classification Search
None
See application file for complete search history.

(56) References Cited

U.S. PATENT DOCUMENTS

| 6,245,417 B1 * | 6/2001 | Huang | G11B 5/72 |
| | | | 428/216 |
| 2007/0231608 A1 * | 10/2007 | Mukai | G11B 5/667 |
| | | | 428/828.1 |

(Continued)

FOREIGN PATENT DOCUMENTS

| JP | 2013-101742 | 5/2013 | |
| JP | 2013-536141 | 9/2013 | |
| SG | WO 2015156736 A1 * | 10/2015 | G11B 5/255 |

OTHER PUBLICATIONS

A. C. Ferrari et al., Raman Spectrum of Graphene and Graphene Layers, Phys. Rev. Lett. 97, 187401, 2006.

*Primary Examiner* — Kevin Bernatz
(74) *Attorney, Agent, or Firm* — IPUSA, PLLC

(57) ABSTRACT

A perpendicular magnetic recording medium includes a perpendicular magnetic layer provided above a nonmagnetic substrate, and a protection layer provided on the perpendicular magnetic layer. The perpendicular magnetic layer has an hcp structure, and includes stacked layers having a (0002) crystal plane oriented parallel to a surface of the nonmagnetic substrate. An uppermost layer amongst the stacked layers includes polycrystal grains selected from a CoCr-base alloy, a CoPt-base alloy, a CoCrPt-base alloy, and a CoPtCr-base alloy. The protection layer makes contact with the uppermost layer of the perpendicular magnetic layer, and includes a single graphene layer or a graphene stack, and an amorphous carbon layer. The single graphene layer or the graphene stack is bonded in parallel to a (0002) crystal plane of the polycrystal grains.

4 Claims, 2 Drawing Sheets

(56) References Cited

U.S. PATENT DOCUMENTS

| | | | |
|---|---|---|---|
| 2007/0231609 A1* | 10/2007 | Ajan | G11B 5/66 428/828.1 |
| 2008/0085426 A1* | 4/2008 | Kurita | G11B 5/66 428/828.1 |
| 2011/0111262 A1* | 5/2011 | Umezawa | G11B 5/65 428/827 |
| 2011/0151278 A1* | 6/2011 | Gurney | G11B 5/8408 428/800 |
| 2013/0102084 A1 | 4/2013 | Loh et al. | |
| 2013/0114165 A1* | 5/2013 | Mosendz | G11B 5/65 360/244 |

* cited by examiner

PERPENDICULAR MAGNETIC RECORDING MEDIUM AND MAGNETIC STORAGE APPARATUS

CROSS-REFERENCE TO RELATED APPLICATIONS

This application is based upon and claims the benefit of priority of the prior Japanese Patent Application No. 2014-238394 filed on Nov. 26, 2014, the entire contents of which are incorporated herein by reference.

BACKGROUND OF THE INVENTION

1. Field of the Invention

The present invention relates to a perpendicular magnetic recording medium and a magnetic storage apparatus.

2. Description of the Related Art

In the field of magnetic recording media used in a HDD (Hard Disk Drive) or the like, the recording density continues to improve at a considerable rate. The recording density is recently increasing at a rate of over approximately 1.5 times per year. One of key technologies for improving the recording density includes a technique that controls a sliding contact characteristic between a magnetic head and the magnetic recording medium.

On the other hand, a Winchester type HDD employs a CSS (Contact Start Stop) system in which a basic operation from a start to stop of the magnetic head includes sliding contact, floating, and sliding contact with respect to the magnetic recording medium. The sliding contact of the magnetic head with respect to the magnetic recording medium is unavoidable, including a case in which an unintentional sliding contact occurs.

For this reason, problems related to tribology between the magnetic head and the magnetic recording medium are the technical problems to be solved inherently. Hence, improving a friction resistance and a sliding contact resistance of the magnetic recording medium by forming a protection layer on a magnetic layer of the magnetic recording medium is one of popular methods of securing a reliability of the magnetic recording medium.

Various materials have been proposed for the protection layer. From viewpoints of easy deposition, durability, or the like, carbon is mainly used for the protection layer. Hardness, density, dynamic coefficient of friction, or the like of the protection layer are important parameters in that these parameters truly affect the CSS characteristic of the magnetic recording medium.

On the other hand, in order to improve the recording density of the magnetic recording medium or improve a read and write speed with respect to the magnetic recording medium, it is preferable to reduce a flying height of the magnetic head, or increase a rotational speed of the magnetic recording medium. Accordingly, the sliding contact resistance and a flatness of the protection layer are required to cope with the unintentional contact or the like with the magnetic head. In addition, the protection layer is preferably thin, and is required to be 30 Å or less, for example, in order to reduce a spacing loss between the magnetic recording medium and the magnetic head and increase the recording density.

In addition, the protection layer is required to have corrosion resistance in order to prevent corrosion generated by environmental substance diffusing onto the magnetic layer of the magnetic recording medium.

A carbon layer that is used for the protection layer of the magnetic recording medium is formed by sputtering, CVD (Chemical Vapor Deposition), ion beam enhanced deposition, or the like. The carbon layer that is formed by the sputtering may have an insufficient durability in a case in which the thickness is 100 Å or less. In addition, the carbon layer that is formed by the CVD easily becomes crystalline and has a poor surface smoothness. Further, in a case in which the carbon layer that is formed by the CVD is thin, a coverage of the surface of the magnetic recording medium deteriorates, and the corrosion of the magnetic recording medium may occur. On the other hand, the ion beam enhanced deposition can form a dense carbon layer having a high hardness and a high surface smoothness, when compared to the sputtering and the CVD.

Known hard carbon layers that may be used for the protection layer include a diamond layer and a DLC (Diamond-Like Carbon) layer. In general, the diamond layer is a crystal layer having a diamond bond of approximately 100%. The DLC layer may be a hard carbon layer that is amorphous, and is thus sometimes referred to as an amorphous carbon layer. The carbon layer that is used for the protection layer of the magnetic recording medium is required to have a high surface smoothness, and for this reason, the crystalline diamond layer is not used in general, and the DLC layer (amorphous carbon layer) is used. Particularly due to the high surface smoothness obtained thereby, a hydrogenated DLC layer (hydrogen-containing DLC layer (amorphous carbon layer)) is preferably used for the protection layer of the magnetic recording medium.

For example, Japanese Laid-Open Patent Publication No. 2013-101742 proposes a magnetic recording medium having a plurality of layers including a plurality of magnetic particles and graphitic carbon formed on the magnetic particles. The graphitic carbon may take various forms, including graphite, graphene (single atomic layer of graphite), nanotube (graphene sheet that is wound to a cylindrical shape), fullerene (graphene sheet that is wound to a closed shape such as a sphere or the like), or the like.

For example, Japanese Laid-Open Patent Publication No. 2013-536141 proposes a FePt/graphene structure for use in hard disks.

Studies to improve the protection layer of the magnetic recording medium continue. Presently, a hydrogenated amorphous carbon layer is popularly used for the protection layer of the magnetic recording medium. The hydrogenated amorphous carbon layer has a high surface smoothness and a relatively high hardness. On the other hand, because the hydrogenated amorphous carbon layer has an amorphous structure, a layer characteristic thereof has a variance, and the friction resistance, the sliding contact resistance, and the corrosion resistance may vary depending on deposition conditions. In addition, since the surface of the hydrogenated amorphous carbon layer is basically water repellent, it is difficult to provide a lubricant coating on the hydrogenated amorphous carbon layer. For this reason, the surface of the hydrogenated amorphous carbon layer needs to be modified by nitridation, oxidation, or the like, to thereby make it difficult to reduce the thickness of the protection layer.

SUMMARY OF THE INVENTION

Embodiments of the present invention may provide a perpendicular magnetic recording medium and a magnetic storage apparatus having satisfactory friction resistance, sliding contact resistance, and corrosion resistance.

According to one aspect of the present invention, a perpendicular magnetic recording medium may include a nonmagnetic substrate; a perpendicular magnetic layer provided above the nonmagnetic substrate; and a protection layer provided on the perpendicular magnetic layer, wherein the perpendicular magnetic layer has a hexagonal close packed structure, and includes a plurality of stacked layers having a (0002) crystal plane oriented parallel to a surface of the nonmagnetic substrate, wherein an uppermost layer of the perpendicular magnetic layer includes polycrystal grains, wherein the polycrystal grains are selected from a group consisting of a CoCr-base alloy, a CoPt-base alloy, a CoCrPt-base alloy, and a CoPtCr-base alloy, wherein the protection layer makes contact with the uppermost layer of the perpendicular magnetic layer, and includes a single graphene layer or a graphene stack, and an amorphous carbon layer, and wherein the single graphene layer or the graphene stack is bonded in parallel to a (0002) crystal plane of the polycrystal grains.

DESCRIPTION OF THE PREFERRED EMBODIMENTS

Figure 1:
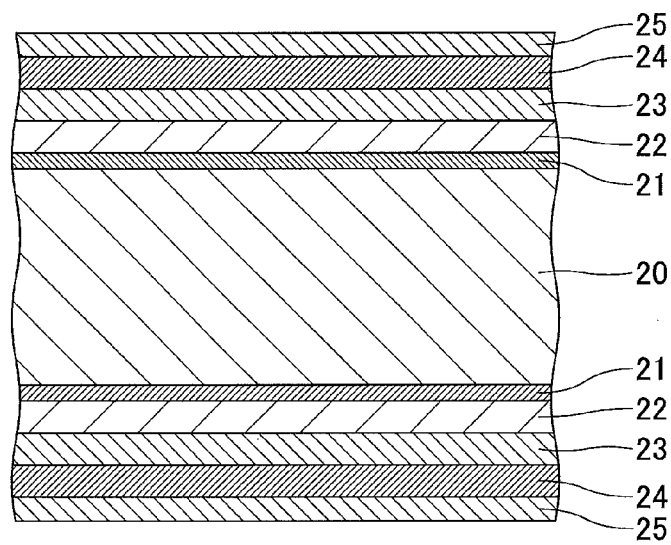
FIG. 1 is a cross sectional view illustrating an example of a perpendicular magnetic recording medium in one embodiment of the present invention.

A description will be given of embodiments and exemplary implementations of a perpendicular magnetic recording medium and a magnetic storage apparatus according to the present invention, by referring to the drawings.

FIG. 1 is a cross sectional view illustrating an example of the perpendicular magnetic recording medium in one embodiment of the present invention. A perpendicular magnetic recording medium 31 illustrated in FIG. 1 includes a nonmagnetic substrate 20. A soft magnetic layer 21, an intermediate layer 22, a perpendicular magnetic layer 23, a protection layer 24, and a lubricant layer 25 are successively stacked on both surfaces of the nonmagnetic substrate 20.

The intermediate layer 22 may be nonmagnetic, or may be magnetic (ferromagnetic).

The perpendicular magnetic layer 23 has axes of easy magnetization primarily oriented perpendicularly to the surface of the nonmagnetic substrate 20. In addition, the perpendicular magnetic layer 23 has an hcp (hexagonal close packed) structure, and includes a plurality of stacked layers having a (0002) crystal plane oriented parallel to the surface of the nonmagnetic substrate 20. An uppermost layer amongst the plurality of stacked layers of the perpendicular magnetic layer includes polycrystal grains, and the polycrystal grains are selected from a group including a CoCr-base alloy, a CoPt-base alloy, a CoCrPt-base alloy, and a CoPtCr-base alloy.

The CoCrPt-base alloy has a composition ratio in which a Cr-content thereof is greater than a Pt-content thereof. On the other hand, the CoPtCr-base alloy has a composition ratio in which a Pt-content thereof is greater than a Cr-content thereof.

The protection layer 24 makes contact with the uppermost layer of the perpendicular magnetic layer 23, and includes a single graphene layer or a graphene stack (or graphene multilayer), and an amorphous carbon layer. The single graphene layer or the graphene stack is bonded in parallel to a (0002) crystal plane of the polycrystal grains. Such a structure can be specified by a Raman spectrum which will be described later.

In general, graphene is deposited at a temperature of 600° C. or higher, and it is difficult to apply the deposition of graphene to a manufacturing process of the magnetic recording medium. In addition, the graphene stack has a peeling property, similarly to that of graphite.

However, because the polycrystal grains included in the uppermost layer of the perpendicular magnetic layer 23 have catalytic activity, the protection layer 24 including the single graphene layer or the graphene stack can be deposited at a temperature of 450° C. or lower. In addition, because the protection layer 24 includes the amorphous carbon layer in addition to the single graphene layer or the graphene stack, it is possible to reduce the peeling of the graphene stack.

A Cr-content of the CoCr-base alloy is preferably 15 at. % to 24 at. %. A Pt-content of the CoPt-base alloy is preferably 8 at. % to 22 at. %. A Cr-content of the CoCrPt-base alloy is preferably 14 at. % to 24 at. %, and a Pt-content of the CoCrPt-base alloy is preferably 8 at. % to 22 at. %. A Pt-content of the CoPtCr-base alloy is preferably 8 at. % to 22 at. %, and a Cr-content of the CoPtCr-base alloy is preferably 7 at. % to 21 at. %.

Each of the CoCr-base alloy, the CoPt-base alloy, the CoCrPt-base alloy, and the CoPtCr-base alloy may include one or more added elements selected from a group including B, Ta, Mo, Cu, Nd, W, Nb, Sm, Tb, Ru, Re, and Mn. In this case, a total content of the one or more added elements is preferably in a range of 1 at. % to 10 at. %.

Figure 2:
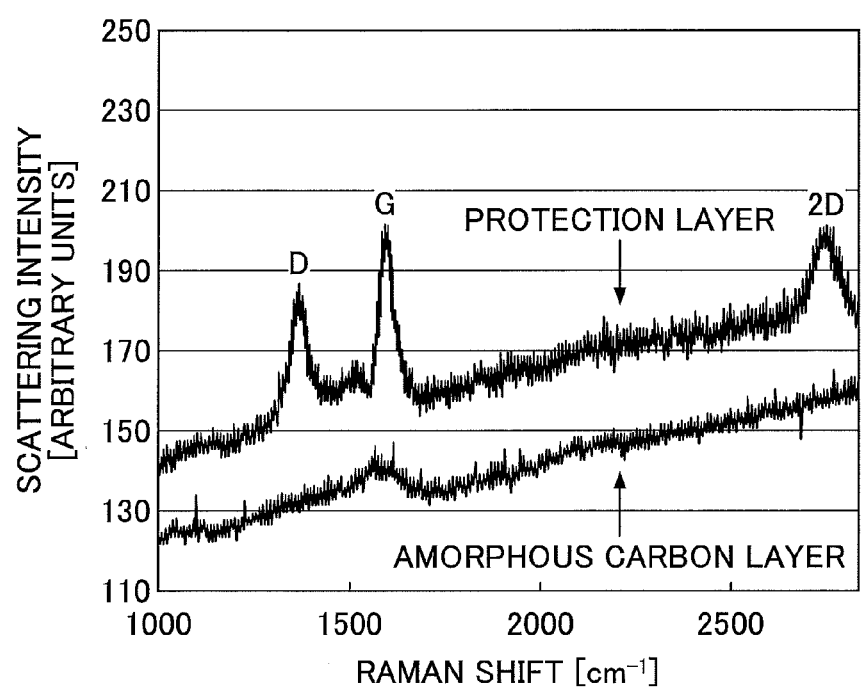
FIG. 2 is a diagram illustrating an example of a Raman spectrum of a protection layer illustrated in FIG. 1.

FIG. 2 is a diagram illustrating an example of the Raman spectrum of the protection layer 24 illustrated in FIG. 1. FIG. 2 also illustrates a Raman spectrum of an amorphous carbon layer (DLC layer including hydrogen). In FIG. 2, the ordinate indicates a scattering intensity (arbitrary units), and the abscissa indicates a Raman shift ($cm^{-1}$).

A G-band related to stretching vibration of an $sp^2$ bond of the single graphene layer or the graphene stack in a vicinity of 1585 $cm^{-1}$, a 2D-band related to a 6-membered ring network structure of the single graphene layer or the graphene stack in a vicinity of 2700 $cm^{-1}$, and a D-band related to amorphization of graphene in a vicinity of 1350 $cm^{-1}$ are observed in the Raman spectrum of the protection layer 24. In other words, the G-band and the 2D-band indicating the existence of the single graphene layer or the graphene stack are observed in the Raman spectrum of the protection layer 24, while the D-band and a broad peak overlapping the D-band and the G-band are also observed. This indicates that the protection layer 24 includes the single graphene layer or the graphene stack, and the amorphous carbon layer, and the single graphene layer or the graphene stack is bonded in parallel to the (0002) crystal plane of the polycrystal grains forming the perpendicular magnetic layer 23.

On the other hand, a broad signal is observed in the Raman spectrum of the amorphous carbon layer, because the amorphous carbon layer has the amorphous structure. For this reason, a layer quality of the amorphous carbon layer may easily change depending on the deposition conditions, to thereby affect the friction resistance, the sliding contact resistance, and the corrosion resistance.

However, because the protection layer 24 includes the crystalline single graphene layer or graphene stack, stable friction resistance, sliding contact resistance, and corrosion resistance can be obtained. Although the protection layer 24 includes the amorphous carbon layer, a surface roughness that may be generated by the amorphous carbon layer is less than or equal to a thickness (approximately 0.3 nm) of an atomic layer. Hence, it may be regarded that the surface smoothness of the perpendicular magnetic recording medium 31 having the protection layer 24 is substantially unaffected by the amorphous carbon layer included in the protection layer 24.

The single graphene layer or the graphene stack included in the protection layer 24 has the structure in which the crystal plane of the 6-membered ring network structure forming the single graphene layer or the graphene stack is bonded in parallel to the (0002) crystal plane of the polycrystal grains included in the perpendicular magnetic layer 23. The catalytic activity of the CoCr-base alloy, the CoPt-base alloy, the CoCrPt-base alloy, or the CoPtCr-base alloy is utilized when forming the protection layer 24. When forming the protection layer 24, it may be assumed that the single graphene layer or the graphene stack electronically bonds with Co. For this reason, the crystal plane of the 6-membered ring network structure forming the single graphene layer or the graphene stack is bonded in parallel to the (0002) crystal plane of the polycrystal grains included in the perpendicular magnetic layer 23. As a result, the protection layer 24, which includes the single graphene layer or the graphene stack, is strongly bonded to the perpendicular magnetic layer 23.

The uppermost layer of the perpendicular magnetic layer 23 preferably has a non-granular structure. In this case, it is possible to increase an area ratio occupied by the CoCr-base alloy, the CoPt-base alloy, the CoCrPt-base alloy, or the CoPtCr-base alloy that strongly bonds to the single graphene layer or the graphene stack, at an interface between the perpendicular magnetic layer 23 and the protection layer 24, in order to improve the bonded state (or adhesion) of the protection layer 24 and the perpendicular magnetic layer 23.

The non-granular structure of the magnetic layer refers to a structure in which the magnetic layer is formed by magnetic particles of the CoCr-base alloy, the CoPt-base alloy, the CoCrPt-base alloy, or the CoPtCr-base alloy, and does not include an oxide, a nitride, a carbide, or the like that is provided in a periphery of the magnetic particles to isolate each of the magnetic particles.

In addition, in order to isolate and reduce the size of the polycrystal grains, layers of the perpendicular magnetic layer 23 other than the uppermost layer are preferably added with an oxide, a nitride, a carbide, or the like of Cr, Si, Ta, Al, B, or the like, and preferably have a granular structure.

The graphene stack preferably includes two or more and ten or less graphene layers that are stacked, and more preferably includes four or more and six or less graphene layers that are stacked. In this case, the graphene stack is protected by the amorphous carbon layer, and peeling of the graphene stack is unlikely to occur. In addition, it becomes easier to bring out the friction resistance, the sliding contact resistance, and the corrosion resistance properties of the graphene stack.

The number of graphene layers forming the graphene stack can be judged from a ratio of the heights of the peaks of the 2D-band and the G-band in the Raman spectrum of the protection layer 24. In other words, in a case in which the height of the peak of the 2D-band is higher than the height of the peak of the G-band, the number of graphene layers forming the graphene stack is one. In a case in which the height of the peak of the 2D-band and the height of the peak of the G-band are the same, the number of graphene layers forming the graphene stack is approximately two. In a case in which the height of the peak of the 2D-band is lower than the height of the peak of the G-band, the number of graphene layers forming the graphene stack is three or more. The exact number of graphene layers forming the graphene stack can be obtained from a ratio of the heights of the peaks of the 2D-band and the G-band in the Raman spectrum of the protection layer 24, as described in Ferrari, A. C. et al., Raman spectrum of graphene and graphene layers, Phys. Rev. Lett. 97, 187401 (2006), for example.

The single graphene layer or the graphene stack is preferably doped with nitrogen. In this case, the doping by nitrogen atoms so as to substitute carbon atoms can be performed while maintaining the 6-membered ring network structure of graphene. Hence, wetting of the protection layer 24 with respect to the lubricant when forming the lubricant layer 25 can be improved, without deteriorating the crystallinity of the single graphene layer or the graphene stack.

The surface of the amorphous carbon layer that is conventionally used for the protection layer is basically water repellent, and for this reason, the surface of the amorphous carbon layer is modified by nitridation, oxidation, or the like in order to form the lubricant layer by coating the lubricant. In addition, in order to modify the surface of the amorphous carbon layer by the nitridation, oxidation, or the like, the amorphous carbon layer needs to have a certain thickness, which makes it difficult to reduce the thickness of the protection layer. Although it is possible to dope the amorphous carbon layer with nitrogen, the layer quality may deteriorate or become unstable, because of the amorphous structure of the amorphous carbon layer. In this case, the friction resistance, the sliding contact resistance, and the corrosion resistance of the protection layer may deteriorate.

A material forming the nonmagnetic substrate 20 is not limited to a particular material. For example, the nonmagnetic substrate 20 may be made of Al, an Al alloy such as an Al—Mg alloy or the like, soda glass, aluminosilicate glass, crystallized glass (or glass ceramics), amorphous glass, silicon, titanium, ceramics, various resins, or the like. The nonmagnetic substrate 20 is preferably made of the Al alloy, glass such as the crystallized glass or the like, or silicon.

An arithmetic average roughness (Ra) of the nonmagnetic substrate 20 is 1 nm or less, preferably 0.5 nm or less, and more preferably 0.1 nm or less.

A material forming the soft magnetic layer 21 is not limited to a particular material. For example, the soft magnetic layer 21 may be made of an FeCo-base alloy (for example, FeCoB, FeCoSiB, FeCoZr, FeCoZrB, and FeCoZrBCu), a CoFe alloy, a FeTa-base alloy (for example, FeTaN and FeTaC), a Co-base alloy (for example, CoTaZr, CoZrNB, and CoB), or the like.

The intermediate layer 22 may be made of a material such as Ru or the like.

The perpendicular magnetic layer 23 can be formed by successively stacking magnetic layers having the granular structure and the magnetic layer having the non-granular structure.

A material forming the magnetic layers having the granular structure is not limited to a particular material. For example, the magnetic layers having the granular structure may be made of a 70Co-5Cr-15Pt-10SiO$_2$ alloy or the like.

A material forming the magnetic layer having the non-granular structure is not limited to a particular material. For example, the magnetic layer having the non-granular structure may be made of a 70Co-15Cr-15Pt alloy or the like.

An orientation control layer may be formed between the soft magnetic layer 21 and the intermediate layer 22.

A material forming the orientation control layer is not limited to a particular material. For example, the orientation control layer may be made of Pt, Pd, an NiCr alloy, an NiFeCr alloy, an NiW alloy, or the like.

The thickness of the perpendicular magnetic layer 23 is in a range of 3 nm to 20 nm, and is preferably in a range of 5 nm to 15 nm.

The thickness of the perpendicular magnetic layer 23 is greater than or equal to a predetermined thickness in order to obtain an output that is greater than or equal to a predetermined value at the time of reading (or reproducing) information from the perpendicular magnetic recording medium 31. Various parameters that represent recording and reproducing characteristics of the perpendicular magnetic recording medium deteriorate as the output that is obtained at the time of reading the information from the perpendicular magnetic recording medium, and for this reason, the thickness of the perpendicular magnetic layer 23 is preferably set according to the configuration of the magnetic storage apparatus (or magnetic recording and reproducing apparatus). In other words, the perpendicular magnetic layer 23 is preferably formed according to the kinds of magnetic alloys and the stacked structure that are used, so that a sufficiently high input and output can be obtained with respect to the magnetic head.

The protection layer 24 may be formed by spraying hydrocarbon gas, such as methane gas or the like, onto the surface of the perpendicular magnetic layer 23 at a temperature of 450° C. or lower, by adding Ar gas, hydrogen gas, or the like if necessary.

A method of forming the protection layer 24 is not limited to a particular method. For example, the protection layer 24 may be formed by UHV (Ultra-High Vacuum)-CVD, thermal CVD, RF (Radio Frequency) plasma CVD, or the like.

The UHV-CVD may form the protection layer 24 in a high vacuum environment of $1\times10^{-6}$ Pa or lower, for example.

The thermal CVD may form the protection layer 24 in a decompression environment in a range of approximately 10 Pa to approximately 10000 Pa, for example.

The RF plasma CVD may form the protection layer 24 in an environment in which the vacuum state is between the vacuum state employed by the UHV-CVD described above and the vacuum state employed by the thermal CVD described above, for example.

A ratio of the single graphene layer or the graphene stack and the amorphous carbon layer included in the protection layer 24 can be controlled by an amount of hydrogen radicals included within the plasma formed by a source gas. In other words, the hydrogen radicals can etch the amorphous carbon layer with an etching rate that is large compared to the etching rate with respect to the single graphene layer or the graphene stack. For this reason, when the amount of hydrogen included in the source gas is increased, the ratio of the single graphene layer or the graphene stack included in the protection layer 24 with respect to the amorphous carbon layer included in the protection layer 24 increases. On the other hand, the ratio of the amorphous carbon layer included in the protection layer 24 increases with respect to the single graphene layer or the graphene stack included in the protection layer 24, when the amount of hydrogen included in the source gas is decreased.

In addition, the ratio of the single graphene layer or the graphene stack and the amorphous carbon layer included in the protection layer 24 may be controlled by a temperature of the nonmagnetic substrate 20 at the time of forming the protection layer 24. Generally, when the temperature of the nonmagnetic substrate 20 is high at the time of forming the protection layer 24, the ratio of the single graphene layer or the graphene stack included in the protection layer 24 with respect to the amorphous carbon layer included in the protection layer 24 increases. On the other hand, the ratio of the amorphous carbon layer included in the protection layer 24 increases with respect to the single graphene layer or the graphene stack included in the protection layer 24, when the temperature of the nonmagnetic substrate 20 is low at the time of forming the protection layer 24.

The lubricant layer 25 can be formed by coating the lubricant on the protection layer 24.

The lubricant forming the lubricant layer 25 is not limited to a particular lubricant. For example, the lubricant layer 25 may be made of a fluoride liquid lubricant such as perfluoropolyether (PFPE) or the like, a solid lubricant such as fatty acid, or the like.

A method of coating the lubricant is not limited to a particular method. For example, the lubricant may be coated by dipping, spin-coating, or the like.

The thickness of the lubricant layer 25 is preferably in a range of 1 nm to 4 nm.

The perpendicular magnetic recording medium 31 can be manufactured using a known in-line deposition apparatus by successively transferring the nonmagnetic substrate 21 amongst a plurality of deposition chambers to successively stack the soft magnetic layer 21, the intermediate layer 22, the perpendicular magnetic layer 23, the protection layer 24, and the lubricant layer 25.

Figure 3:
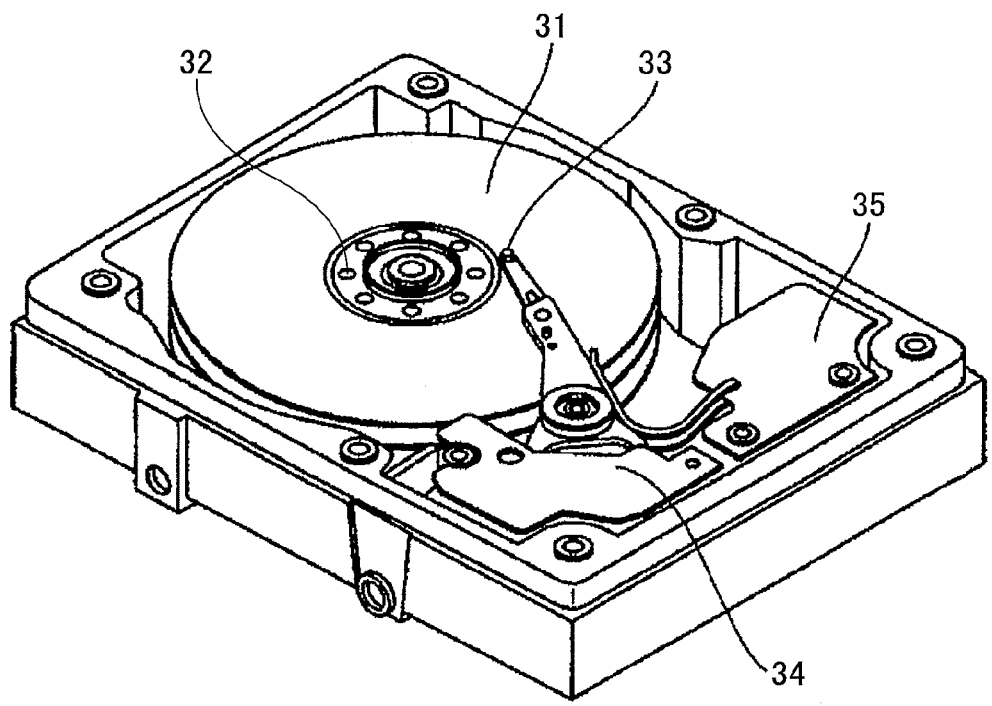
FIG. 3 is a perspective view illustrating an example of a magnetic storage apparatus in one embodiment of the present invention.

FIG. 3 is a perspective view illustrating an example of a magnetic storage apparatus in one embodiment of the present invention.

A magnetic storage apparatus 30 illustrated in FIG. 3 includes the perpendicular magnetic recording medium 31, a medium driving part 32 that drives and rotates the perpendicular magnetic recording medium 31, a magnetic head 33, a head driving part 34 that drives the magnetic head 33 to move above the perpendicular magnetic recording medium 31, and a signal processing part 35. The magnetic head 33 writes (or records) information on and reads (or reproduces) the information from the perpendicular magnetic recording medium 31. The signal processing part 35 processes input data into recording signals to be recorded on the perpendicular magnetic recording medium 31, and supplies the recording signals to the magnetic head 33. The signal processing part 35 also processes signals read from the perpendicular magnetic recording medium 31 by the magnetic head 33 into reproduced signals to be output from the magnetic storage apparatus 30.

Of course, two or more perpendicular magnetic recording media 31 may be provided in the magnetic storage apparatus 30. In this case, a number of magnetic heads 33 determined according to the number of perpendicular magnetic recording media 31 are provided in the magnetic storage apparatus 30.

Next, a description will be given of an exemplary implementation of the present invention.

The perpendicular magnetic recording medium illustrated in FIG. 1 is manufactured in the following manner according to one exemplary implementation of the present invention.

First, an amorphous glass substrate having an outer diameter of 2.5 inches is prepared as the nonmagnetic substrate 20.

Next, an in-line deposition apparatus C3010 manufactured by Canon Anelva Corporation is used to successively form the soft magnetic layer 21, the intermediate layer 22, and the perpendicular magnetic layer 23 on both surfaces of the nonmagnetic substrate 20 that is loaded onto a carrier. In this example, the soft magnetic layer 21 is formed by a CoFe alloy (70Co-30Fe) layer having a thickness of 30 nm, an Ru layer having a thickness of 5 nm, and a CoFe alloy (70Co-30Fe) layer having a thickness of 30 nm that are successively stacked. In addition, the intermediate layer 22 is formed by an NiW alloy (90Ni-10W) layer having a thickness of 7 nm, and an Ru layer having a thickness of 20 nm that are successively stacked. Furthermore, the perpendicular magnetic layer 23 is formed by CoPtCr-base alloy (70Co-15Pt-5Cr-10SiO$_2$) layers having a granular structure and a thickness of 6 nm, and a CoCrPt-base alloy (64Co-20Cr-15Pt-1B) layer having a non-granular structure and a thickness of 6 nm that are successively stacked. The CoCrPt-base alloy layers having the granular structure and the CoCrPt-base alloy layer having the non-granular structure have the hcp structure, and the (0002) crystal planes thereof are orientated parallel with respect to the surface of the nonmagnetic substrate 20.

Next, a thermal CVD apparatus is used to form the protection layer 24 on the perpendicular magnetic layer 23. More particularly, a gas mixture including argon, hydrogen, and methane at a volume ratio of 1:1:9 is used as the source gas, and the protection layer 24 is formed to a thickness of approximately 1 nm at a reaction pressure of 2 kPa, a temperature of the nonmagnetic substrate 20 of 450° C., and a reaction time of 30 minutes.

A Raman spectroscopy system manufactured by Tokyo Instruments Inc. is used to analyze the protection layer 24. In the analysis results, a D-band that is approximately 1.6 times the 2D-band was observed. It was confirmed that the protection layer 24 included the graphene stack in which three graphene layers are stacked, and the amorphous carbon layer, and that the graphene stack is parallel with respect to each of the (0002) crystal planes of the polycrystal grains forming the perpendicular magnetic layer 23. The Raman spectroscopy system used a high-sensitivity cooled CCD detector manufactured by Andor Technology, and a diffraction grating having a groove number of 1200/nm and a braze wavelength of 500 nm.

Next, a dipping apparatus is used to coat a perfluoropolyether lubricant on the protection layer 24 to form the lubricant layer 25 to a thickness of 1.4 nm, and the perpendicular magnetic recording medium 31 is completed.

The completed perpendicular magnetic recording medium 31 was assembled into the magnetic storage apparatus 30 illustrated in FIG. 3, and subjected to a high-temperature high-humidity environment. When the friction resistance, the sliding contact resistance, and the corrosion resistance of the perpendicular magnetic recording medium 31 were evaluated by an accelerated endurance test, it was confirmed that the friction resistance, the sliding contact resistance, and the corrosion resistance of the perpendicular magnetic recording medium 31 are improved over those of the conventional magnetic recording medium.

According to the embodiments and exemplary implementations described above, it is possible to provide a perpendicular magnetic recording medium having satisfactory friction resistance, sliding contact resistance, and corrosion resistance, and a magnetic storage apparatus having such a perpendicular magnetic recording medium.

Further, the present invention is not limited to these embodiments and exemplary implementations, but various variations and modifications may be made without departing from the scope of the present invention.

What is claimed is:

1. A perpendicular magnetic recording medium comprising:
    a nonmagnetic substrate;
    a perpendicular magnetic layer provided above the nonmagnetic substrate; and
    a protection layer provided on the perpendicular magnetic layer,
    wherein the perpendicular magnetic layer has a hexagonal close packed structure, and includes a plurality of stacked layers having a (0002) crystal plane oriented parallel to a surface of the nonmagnetic substrate,
    wherein an uppermost layer, amongst the plurality of stacked layers of the perpendicular magnetic layer, has a non-granular structure and includes polycrystal grains but does not include an oxide, nitride or carbide isolating the polycrystal grains,
    wherein the polycrystal grains are selected from a group consisting of a CoCr-base alloy, a CoPt-base alloy, a CoCrPt-base alloy, and a CoPtCr-base alloy,
    wherein the protection layer makes contact with the uppermost layer of the perpendicular magnetic layer, and includes a single graphene layer or a graphene stack, and an amorphous carbon layer,
    wherein the single graphene layer or the graphene stack is bonded in parallel to a (0002) crystal plane of the polycrystal grains, and
    wherein the graphene stack includes two or more and ten or less graphene layers that are stacked.

2. The perpendicular magnetic recording medium as claimed in claim 1, wherein the single graphene layer or the graphene stack of the protection layer is doped with nitrogen.

3. A magnetic storage apparatus comprising:
    a perpendicular magnetic recording medium that includes
        a nonmagnetic substrate;
        a perpendicular magnetic layer provided above the nonmagnetic substrate; and
        a protection layer provided on the perpendicular magnetic layer,
        wherein the perpendicular magnetic layer has a hexagonal close packed structure, and includes a plurality of stacked layers having a (0002) crystal plane oriented parallel to a surface of the nonmagnetic substrate,
        wherein an uppermost layer, amongst the plurality of stacked layers of the perpendicular magnetic layer, has a non-granular structure and includes polycrystal grains but does not include an oxide, nitride or carbide isolating the polycrystal grains,
        wherein the polycrystal grains are selected from a group consisting of a CoCr-base alloy, a CoPt-base alloy, a CoCrPt-base alloy, and a CoPtCr-base alloy,
        wherein the protection layer makes contact with the uppermost layer of the perpendicular magnetic layer, and includes a single graphene layer or a graphene stack, and an amorphous carbon layer,
        wherein the single graphene layer or the graphene stack is bonded in parallel to a (0002) crystal plane of the polycrystal grains, and
        wherein the graphene stack includes two or more and ten or less graphene layers that are stacked; and
    a magnetic head configured to read and write information with respect to the perpendicular magnetic layer of the perpendicular magnetic recording medium.

4. The magnetic storage apparatus as claimed in claim 3, wherein the single graphene layer or the graphene stack of the protection layer of the perpendicular magnetic recording medium is doped with nitrogen.

* * * * *